(12) United States Patent
Tseng et al.

(10) Patent No.: US 12,633,268 B2
(45) Date of Patent: May 19, 2026

(54) DISPLAY DEVICE AND DRIVING METHOD THEREOF

(71) Applicant: E Ink Holdings Inc., Hsinchu (TW)

(72) Inventors: Hsien-Kai Tseng, Hsinchu (TW);
Wei-Chen Tsai, Hsinchu (TW);
Sheng-Wei Chen, Hsinchu (TW);
Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/793,953

(22) Filed: Aug. 5, 2024

(65) Prior Publication Data

US 2025/0095596 A1      Mar. 20, 2025

Related U.S. Application Data

(60) Provisional application No. 63/539,093, filed on Sep. 18, 2023.

(51) Int. Cl.
| | | |
|---|---|---|
| *G09G 3/34* | (2006.01) | |
| *G02F 1/167* | (2019.01) | |
| *G02F 1/1685* | (2019.01) | |

(52) U.S. Cl.
CPC ............. *G09G 3/344* (2013.01); *G02F 1/167* (2013.01); *G02F 1/1685* (2019.01); *G09G 2320/041* (2013.01)

(58) Field of Classification Search
CPC ..... G02F 1/167; G02F 1/16757; G09G 3/344; G09G 2320/041
See application file for complete search history.

(56) References Cited

U.S. PATENT DOCUMENTS

| | | | |
|---|---|---|---|
| 8,860,658 B2 | 10/2014 | Hage et al. | |
| 10,467,982 B2 | 11/2019 | Mohammadi et al. | |
| 2009/0153946 A1* | 6/2009 | Nakamura | G02F 1/167 |
| | | | 359/296 |
| 2012/0087389 A1* | 4/2012 | Howe | G01K 7/00 |
| | | | 374/142 |
| 2013/0265166 A1* | 10/2013 | Wang | G01N 27/048 |
| | | | 340/602 |
| 2020/0235175 A1* | 7/2020 | Hasegawa | H10K 59/88 |
| 2021/0117145 A1* | 4/2021 | Kim | G09G 5/003 |

FOREIGN PATENT DOCUMENTS

| | | |
|---|---|---|
| CN | 115440155 A | 12/2022 |

OTHER PUBLICATIONS

Office Action of Taiwan counterpart application, issued on Dec. 3, 2025, p. 1-p. 6.

* cited by examiner

*Primary Examiner* — Priyank J Shah
(74) *Attorney, Agent, or Firm* — JCIPRNET

(57) ABSTRACT

A display device including an element array substrate, an electrophoretic display substrate and a humidity sensor is provided. The electrophoretic display substrate is disposed on the element array substrate. The humidity sensor includes a conductive pattern disposed on a side of the element array substrate adjacent to the electrophoretic display substrate. A driving method of the display device is also provided.

11 Claims, 9 Drawing Sheets

DISPLAY DEVICE AND DRIVING METHOD THEREOF

CROSS-REFERENCE TO RELATED APPLICATION

This application claims the priority benefit of U.S. provisional application Ser. No. 63/539,093, filed on Sep. 18, 2023. The entirety of the above-mentioned patent application is hereby incorporated by reference herein and made a part of this specification.

TECHNICAL FIELD

This disclosure relates to a display device and a driving method thereof.

DESCRIPTION OF RELATED ART

A display media layer in a display device is sensitive to environmental parameters such as humidity and/or temperature. Therefore, sensing the humidity and/or temperature of the display device and providing appropriate driving waveforms according to the environmental parameters such as humidity and/or temperature are necessary to improve the optical performance.

SUMMARY

This disclosure provides a display device and a driving method thereof, which helps to improve optical performance.

A display device of this disclosure includes an element array substrate, an electrophoretic display substrate, and a humidity sensor. The electrophoretic display substrate is disposed on the element array substrate. The humidity sensor includes a conductive pattern disposed on a side of the element array substrate adjacent to the electrophoretic display substrate.

In an embodiment of this disclosure, the humidity sensor is a capacitive humidity sensor or a resistive humidity sensor.

In an embodiment of this disclosure, the conductive pattern surrounds a display area of the display device.

In an embodiment of this disclosure, the conductive pattern overlaps the electrophoretic display substrate and is located between the electrophoretic display substrate and the element array substrate.

In an embodiment of this disclosure, a number of humidity sensors is multiple, and the multiple humidity sensors are disposed at least adjacent to multiple corners of the display device.

In an embodiment of this disclosure, the element array substrate includes a dielectric layer, the electrophoretic display substrate includes an adhesive layer, and the humidity sensor is disposed between the dielectric layer and the adhesive layer.

In an embodiment of this disclosure, the display device further includes a driving chip. The driving chip is disposed in a surrounding area of the display device and is electrically connected to the humidity sensor, the element array substrate, and the electrophoretic display substrate.

In an embodiment of this disclosure, the display device further includes a circuit board. The humidity sensor is electrically connected to the driving chip through the circuit board.

In an embodiment of this disclosure, the display device further includes a temperature sensor. The temperature sensor is disposed in the element array substrate and located on a side away from the electrophoretic display substrate.

In an embodiment of this disclosure, the element array substrate includes a substrate and a gate dielectric layer disposed on the substrate, and the temperature sensor is disposed between the substrate and the gate dielectric layer.

In an embodiment of this disclosure, the display device further includes a driving chip. The driving chip is disposed in a surrounding area of the display device and is electrically connected to the humidity sensor, the temperature sensor, the element array substrate, and the electrophoretic display substrate.

A driving method of a display device of this disclosure includes: providing the display device; confirming a resistance value or a capacitance value of a humidity sensor of the display device; confirming humidity according to the resistance value or the capacitance value of the humidity sensor; and providing a driving waveform according to the humidity.

In an embodiment of this disclosure, the driving method of the display device further includes: confirming a resistance value of a temperature sensor of the display device; and confirming a temperature according to the resistance value of the temperature sensor. The driving waveform is also provided according to the temperature in addition to the humidity.

In order to make the above-mentioned features and advantages of this disclosure more obvious and easy to understand, embodiments are given below and described in detail with reference to the accompanying drawings.

BRIEF DESCRIPTION OF THE DRAWINGS

The accompanying drawings are included to provide a further understanding of this disclosure, and are incorporated in and constitute a part of this specification. The drawings illustrate embodiments of this disclosure and, together with the description, serve to explain the principles of this disclosure.

DETAILED DESCRIPTION OF DISCLOSED EMBODIMENTS

The directional terms mentioned in this disclosure, such as "upper", "lower", "front", "back", "left", and "right" referred to herein are only for reference to directions illustrated in accompanying drawings. Therefore, the directional terms used are for description and not intended to limit the disclosure.

In the accompanying drawings, each drawing illustrates the general features of methods, structures, or materials that are used in particular embodiments. However, these drawings should not be interpreted as defining or limiting the scope or nature encompassed by these embodiments. For instance, for the interest of clarity, the relative sizes, thicknesses, and locations of each film layer, area, or structure may be reduced or exaggerated.

In the accompanying drawings, the same or similar elements will be given the same or similar numerals, and redundant descriptions will be omitted in the specification. In addition, features of different embodiments may be combined with each other without conflict, and simple equivalent changes and modifications made in accordance with the specification or the claims are still within the scope covered by this disclosure.

As disclosed herein, an element/film layer disposed on (or above) another element/film layer may cover the case where the element/film layer is directly disposed on (or above) the other element/film layer, and the two elements/film layers are directly in contact; as well as the case where the element/film layer is indirectly disposed on (or above) the other element/film layer, and there are one or more elements/film layers between the two elements/film layers.

Figure 1:
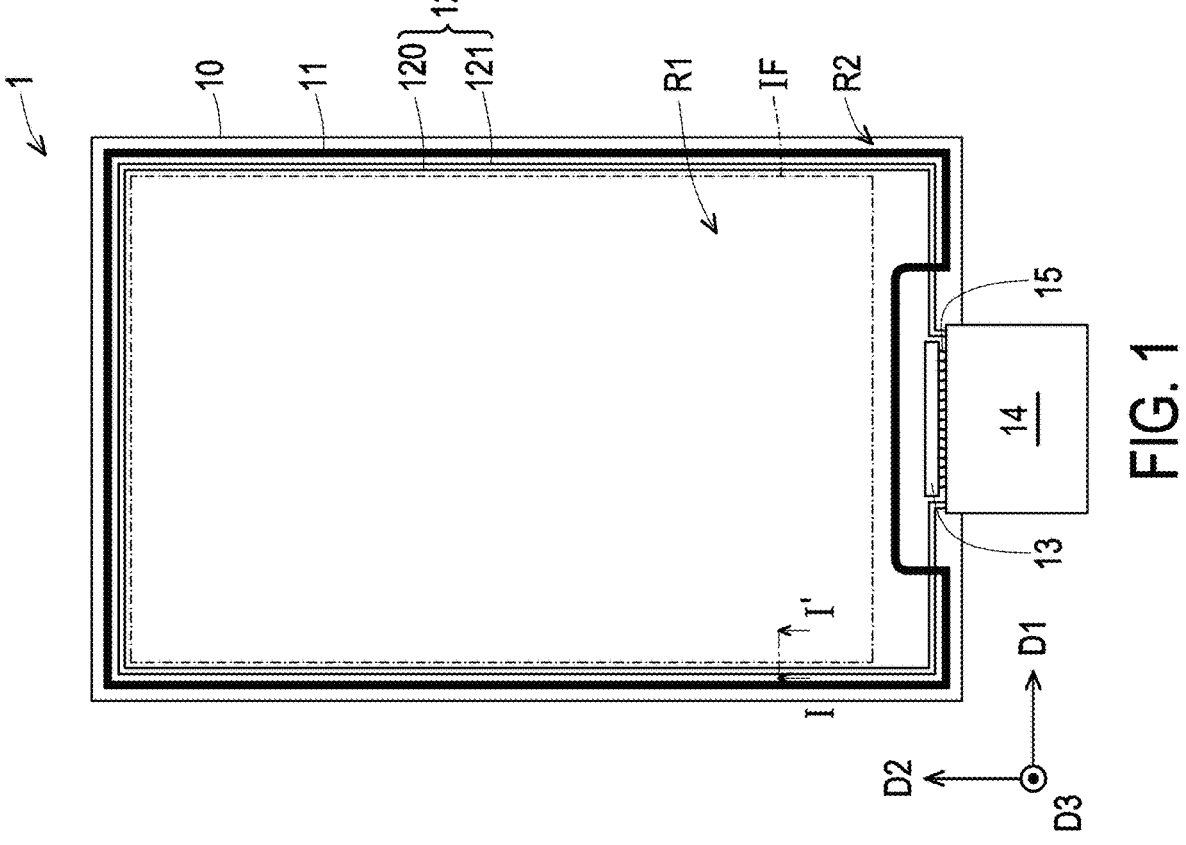
FIG. 1 is a schematic top view of a display device according to the first embodiment of this disclosure.
Figure 2:
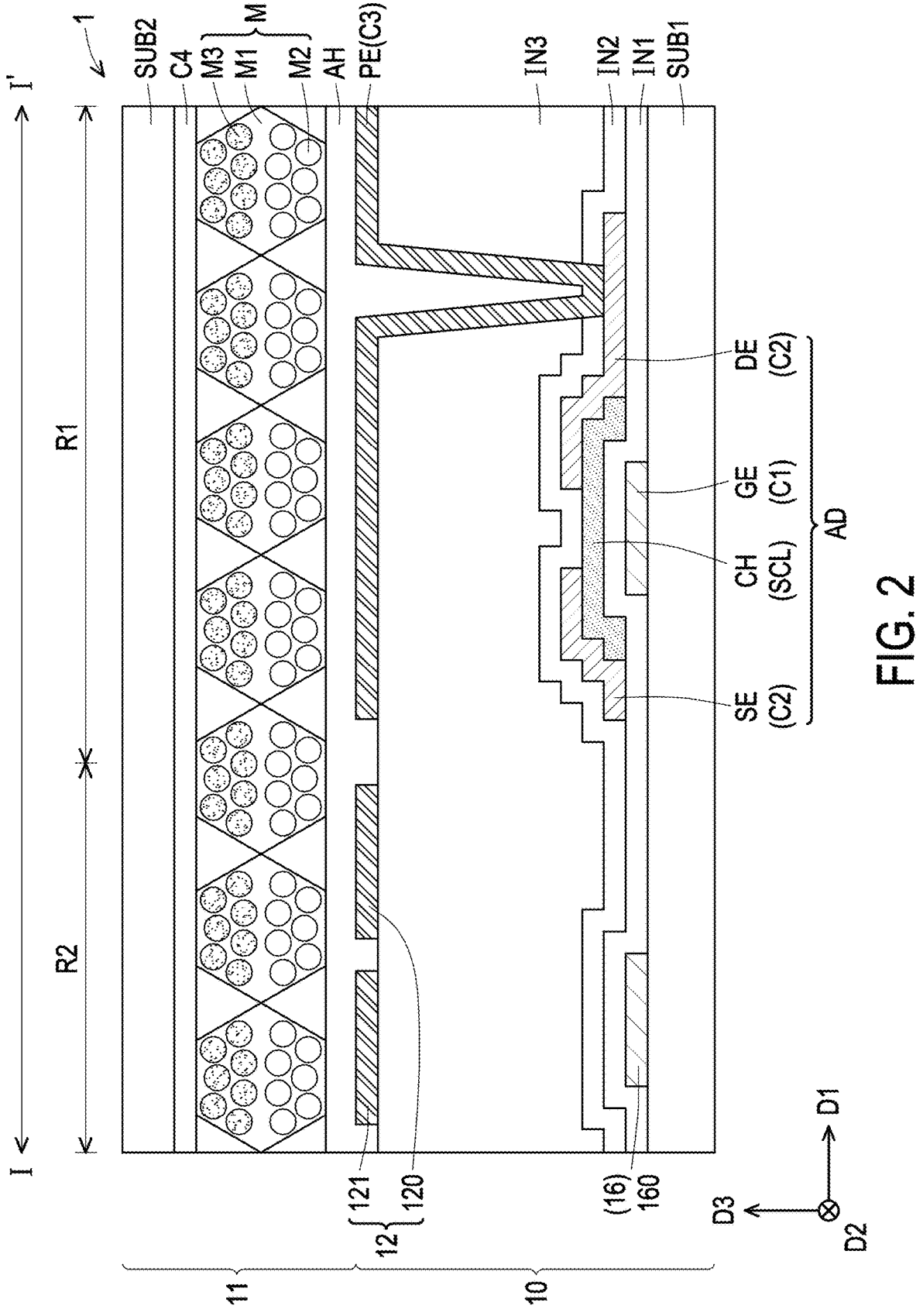
FIG. 2 is a schematic cross-sectional view corresponding to a mid-section line I-I' in FIG. 1.

FIG. 1 is a schematic top view of a display device according to the first embodiment of this disclosure. FIG. 2 is a schematic cross-sectional view corresponding to a mid-section line I-I' in FIG. 1. Please refer to FIG. 1 first. A display device 1 may have a display area R1 and a surrounding area R2 connected to the display area R1. For ease of identification, in FIG. 1, a junction IF of the display area R1 and the surrounding area R2 is marked with a dotted line. Viewing from the top view, as shown in FIG. 1, the surrounding area R2 may be located on at least one side of the display area R1. In some embodiments, the surrounding area R2 may surround the display area R1, but is not limited thereto.

The display area R1 may be used to display images, while the surrounding area R2 may be used to configure peripheral circuits or other elements. In some embodiments, although not shown, the display device 1 may include an opaque outer frame to shield the surrounding area R2, wherein the opaque outer frame may include a transparent opening overlapping the display area R1 in a direction D3, so that a user can view the image provided by the display device 1 from the display area R1.

Please refer to FIG. 1 and FIG. 2. The display device 1 may include an element array substrate 10, an electrophoretic display substrate 11, and a humidity sensor 12. For ease of identification, the edge of the electrophoretic display substrate 11 is marked with a thick line in FIG. 1. In some embodiments, as shown in FIG. 1, the element array substrate 10 may have a larger area than the electrophoretic display substrate 11, but is not limited thereto.

In some embodiments, as shown in FIG. 2, the element array substrate 10 may include a substrate SUB1, a conductive layer C1, a dielectric layer IN1, a semiconductor layer SCL, a conductive layer C2, a dielectric layer IN2, a dielectric layer IN3, and a conductive layer C3, but is not limited thereto. According to different requirements, one or more film layers may be added to or removed from the element array substrate 10.

The substrate SUB1 may be a hard substrate or a flexible substrate, and the transparency of the substrate SUB1 may not be limited. That is to say, the substrate SUB1 may be a transparent substrate, a translucent substrate, or an opaque substrate. For instance, the material of the substrate SUB1 may include glass, plastic, or other suitable materials. According to different requirements, the substrate SUB1 may also be an insulating thin film.

The conductive layer C1 is disposed on the substrate SUB1. The material of the conductive layer C1 may include an opaque conductive material, a transparent conductive material, or a combination thereof. The opaque conductive material may include metal, alloy, or a combination thereof. The transparent conductive material may include metal oxide, metal nitride, metal oxynitride, other suitable transparent conductive materials, or a combination thereof. The metal oxide may include indium tin oxide, indium zinc oxide, aluminum tin oxide, aluminum zinc oxide, or indium germanium zinc oxide, but is not limited thereto.

The conductive layer C1 may be a patterned conductive layer and may include multiple gates GE (one is schematically shown in FIG. 2), multiple gate lines (not shown), and/or other conductive lines (not shown). The gates GE and the gate lines are, for example, located in the display area R1. Each gate GE may be electrically connected to a corresponding gate line.

The dielectric layer IN1 is disposed on the conductive layer C1 and the substrate SUB1. The dielectric layer IN1 is a gate dielectric layer, and its material is, for example, an inorganic dielectric layer. For instance, the material of the dielectric layer IN1 may include silicon oxide, silicon oxynitride, silicon nitride, etc., or a combination thereof.

The semiconductor layer SCL is disposed on the dielectric layer IN1. The material of the semiconductor layer SCL may include crystalline silicon, amorphous silicon, polycrystalline silicon, an oxide semiconductor, an organic semiconductor, etc., wherein the oxide semiconductor may include indium-gallium-zinc oxide (IGZO), zinc oxide (ZnO), tin oxide (SnO), indium-zinc oxide (IZO), gallium-zinc oxide (GZO), zinc-tin oxide (ZTO), or indium-tin oxide (ITO), but is not limited thereto.

The semiconductor layer SCL may be a patterned semiconductor layer and may include multiple semiconductor patterns CH (one is schematically shown in FIG. 2). The semiconductor patterns CH, for example, are located in the display area R1, and the semiconductor patterns CH respectively overlap the gates GE in the direction D3.

The conductive layer C2 is disposed on the semiconductor layer SCL and the dielectric layer IN1. For the material of the conductive layer C2, reference may be made to the material of the conductive layer C1, which will not be repeated here.

The conductive layer C2 may be a patterned conductive layer and may include multiple sources SE (one is schematically shown in FIG. 2), multiple drains DE (one is schematically shown in FIG. 2), multiple data lines (not shown), and/or other conductive lines (not shown). The sources SE, the drains DE, and the data lines are, for example, located in the display area R1, and each of the sources SE may be electrically connected to a corresponding data line. In some embodiments, the element array substrate 10 may also include an active element AD. The active element AD is, for example, located in the display area R1 and may include a gate GE, a semiconductor pattern CH, a source SE, and a drain DE, but is not limited thereto. The active element AD in FIG. 2 uses a bottom gate thin film transistor as an example, but it should be understood that the type of the active element AD may be changed according to actual requirements and is not limited thereto.

In some embodiments, the element array substrate 10 may include multiple active elements AD. The active elements AD may be arranged in an array along a direction D1 and a direction D2. The direction D1 and the direction D2 intersect each other and are both perpendicular to the direction D3. In some embodiments, the direction D1 and the direction D2 may be perpendicular to each other.

The dielectric layer IN2 is disposed on the conductive layer C2, the semiconductor layer SCL, and the dielectric layer IN1. The dielectric layer IN2 is, for example, an inorganic dielectric layer. For instance, the material of the dielectric layer IN2 may include silicon oxide, silicon oxynitride, silicon nitride, etc., or a combination thereof.

The dielectric layer IN3 is disposed on the dielectric layer IN2. The dielectric layer IN3 is, for example, a flat layer and may include an organic dielectric layer. For instance, the material of the dielectric layer IN3 may include polyimide resin, epoxy resin, acrylic resin, or other polymer materials.

The conductive layer C3 is disposed on the dielectric layer IN3. For the material of the conductive layer C3, reference may be made to the material of the conductive layer C1, which will not be repeated here.

The conductive layer C3 may be a patterned conductive layer and may include multiple pixel electrodes PE (one is schematically shown in FIG. 2) and/or other conductive lines (not shown). The pixel electrodes PE are, for example, located in the display area R1. Each of the pixel electrodes PE may extend into a through hole (not marked) penetrating the dielectric layer IN3 and the dielectric layer IN2 to be electrically connected to a corresponding drain DE.

The electrophoretic display substrate 11 is disposed on the element array substrate 10 and is closer to a light incident side of the display device 1 (for example, a side of the display device 1 facing the user when the user is viewing an image) than the element array substrate 10. In some embodiments, as shown in FIG. 2, the electrophoretic display substrate 11 may include a substrate SUB2, a conductive layer C4, an electrophoresis layer M, and a bonding layer AH, but is not limited thereto. According to different requirements, one or more film layers may be added to or removed from the electrophoretic display substrate 11.

The substrate SUB2 may be a hard substrate or a flexible substrate, and the substrate SUB2 is a transparent substrate to reduce the shielding or absorption of a light beam. For instance, the material of the substrate SUB2 may include glass, plastic, or other suitable materials. According to different requirements, the substrate SUB2 may also be an insulating thin film.

The conductive layer C4 is disposed on a surface of the substrate SUB2 facing the element array substrate 10. The material of the conductive layer C4 may include a transparent conductive material. In addition, the conductive layer C4 may be an entire surface of conductive layer, such as a common electrode layer, but is not limited thereto.

The electrophoresis layer M is disposed on a surface of the conductive layer C4 facing the element array substrate 10. For instance, the electrophoresis layer M may include an electrophoresis solution M1, multiple white electrophoretic particles M2, and multiple black electrophoretic particles M3, but is not limited thereto. The electrophoresis solution M1 is, for example, transparent. The white electrophoretic particles M2 and the black electrophoretic particles M3 are distributed in the electrophoresis solution M1, and the white electrophoretic particles M2 and the black electrophoretic particles M3 may have opposite electrical properties. In this way, through changing a voltage applied to a pixel electrode PE and the common electrode layer (such as the conductive layer C4), or through changing a voltage or a driving waveform applied to the pixel electrode PE while the voltage of the common electrode layer (such as the conductive layer C4) is fixed, the distribution of the white electrophoretic particles M2 and the black electrophoretic particles M3 may be controlled so as to control the image displayed by the display device 1. Although FIG. 2 shows that the electrophoresis layer M has a microcup structure, the cross-sectional shape of each of the microcup structures is a hexagon, charged particles of two colors are disposed inside each microcup structure, and the electrophoresis solution M1 is transparent, but this disclosure is not limited thereto. In other embodiments, although not shown, the cross-sectional shape of each of the microcup structures may be a circle, an ellipse, or other polygons, the charged particles of one color or multiple colors may be disposed inside each of the microcup structures, and the electrophoresis solution M1 may be a colored or transparent electrophoresis solution. Alternatively, the electrophoresis layer M may have a microcapsule structure.

The bonding layer AH is disposed between the electrophoresis layer M and the conductive layer C4, and the electrophoretic display substrate 11 may be fixed to the element array substrate 10 through the bonding layer AH. The bonding layer AH is, for example, an insulating adhesive layer and may be an insulating organic adhesive layer, but is not limited thereto. For instance, the bonding layer AH may be an optically clear adhesive (OCA), an optically clear resin (OCR), or other suitable adhesive materials.

The humidity sensor 12 is disposed on a side of the element array substrate 10 adjacent to the electrophoretic display substrate 11. For instance, as shown in FIG. 1, a part (such as a part away from a driving chip 13) of the humidity sensor 12 may overlap the electrophoretic display substrate 11 in the direction D3, and another part (such as a part adjacent to the driving chip 13) of the humidity sensor 12 may not overlap the electrophoretic display substrate 11 in the direction D3. In addition, the overlapping part of the humidity sensor 12 and the electrophoretic display substrate 11 may be located, for example, between the electrophoretic display substrate 11 and the element array substrate 10. Take FIG. 2 as an example. The overlapping part of the sensor 12 and the electrophoretic display substrate 11 may be located between the bonding layer AH of the electrophoretic display substrate 11 and the dielectric layer IN3 of the element array substrate 10 to sense the humidity of the electrophoretic display substrate 11, but is not limited thereto. In other embodiments, although not shown in FIG. 2, the humidity sensor 12 may not overlap the electrophoretic display substrate 11 in the direction D3. For instance, the humidity sensor 12 may be disposed on a part of the element array substrate 10 not covered by the electrophoretic display substrate 11 to sense the humidity around the electrophoretic display substrate 11, but is not limited thereto.

In some embodiments, the humidity sensor 12 is a conductive pattern layer and may be a capacitive humidity sensor or a resistive humidity sensor, and the manufacturing process of the humidity sensor 12 may be integrated with the manufacturing process of a part of the film layers in the element array substrate 10 to save the manufacturing process, time, and/or cost. Taking the capacitive humidity sensor as an example, as shown in FIG. 1 and FIG. 2, the humidity sensor 12 includes, for example, a circular conductive pattern 120 and a circular conductive pattern 121. Although the humidity sensor 12 of this embodiment is described with the above patterns, this disclosure is not limited to the above patterns.

The circular conductive pattern 120 and the circular conductive pattern 121 are, for example, located in the surrounding area R2, wherein the circular conductive pattern 120 surrounds the display area R1, the circular conductive pattern 121 is separated from the circular conductive pattern 120, and the circular conductive pattern 121 surrounds the circular conductive pattern 120. At least part of the circular conductive pattern 120 and at least part of the circular conductive pattern 121 overlap the electrophoretic display substrate 11 and are located between the electrophoretic display substrate 11 and the element array substrate 10. A gap between the circular conductive pattern 121 and the circular conductive pattern 120 is, for example, filled with the insulating organic adhesive layer (the bonding layer AH). Thus, the circular conductive pattern 120, the circular conductive pattern 121, and the bonding layer AH located between the two form a capacitor; the circular conductive pattern 120, the electrophoresis layer M on the circular conductive pattern 120, and the bonding layer AH located between the two form a capacitor; and the circular conductive pattern 121, the electrophoresis layer M on the circular conductive pattern 121, and the bonding layer AH located between the two form a capacitor.

A dielectric constant of an organic dielectric layer (such as the bonding layer AH and the dielectric layer IN3) changes as the humidity changes. For example, the dielectric constant of the organic dielectric layer increases as the humidity increases. Therefore, a capacitance value of the humidity sensor 12 also changes as the humidity changes. For example, the capacitance value of the humidity sensor 12 increases as the humidity increases. By measuring the capacitance value of the humidity sensor 12, the humidity of the electrophoretic display substrate 11 or the humidity around the electrophoretic display substrate 11 may be determined according to the measured capacitance value, and the driving waveform corresponding to the humidity interval is provided to the pixel electrode PE according to the humidity to improve the optical performance of the display device 1.

According to different requirements, the display device 1 may also include other elements or film layers. For instance, as shown in FIG. 1, the display device 1 may also include a driving chip 13. The driving chip 13 is, for example, disposed in the surrounding area R2 and is electrically connected to the element array substrate 10, the electrophoretic display substrate 11, and the humidity sensor 12. For instance, the gate lines (not shown) and the data lines (not shown) in the element array substrate 10 and the common electrode layer (such as the conductive layer C4) in the electrophoretic display substrate 11 may be electrically connected to the driving chip 13 through multiple wires (not shown), multiple conductive vias (not shown), or a combination of the above, but is not limited thereto.

In some embodiments, the display device 1 may further include a circuit board 14, wherein the humidity sensor 12 may be electrically connected to the driving chip 13 through the circuit board 14. For instance, the display device 1 may further include multiple wires 15 connected between the circuit board 14 and the driving chip 13, and the humidity sensor 12 may be electrically connected to the driving chip 13 through the circuit board 14 and the wires 15. The circuit board 14 may electrically connect the driving chip 13 to an external circuit (not shown, such as a power supply). For instance, the circuit board 14 may be a flexible printed circuit board, but is not limited thereto. Although the driver chip 13 is bonded to the element array substrate 10 in FIG. 1, this disclosure is not limited thereto. In other embodiments, the driving chip 13 may be bonded to the circuit board 14. The following embodiments may be changed accordingly, which will not be repeated below.

In some embodiments, the display device 1 may also include a temperature sensor 16. In order to clearly show the relative configuration relationship between the humidity sensor 12 and other elements, the temperature sensor 16 is omitted in FIG. 1. For the relative configuration relationship between the temperature sensor 16 and other elements or film layers, please refer to FIG. 2. As shown in FIG. 2, the temperature sensor 16 is, for example, disposed in the element array substrate 10 and located on a side away from the electrophoretic display substrate 11. Taking FIG. 2 as an example, the temperature sensor 16 is, for example, disposed between the substrate SUB1 and the dielectric layer IN1 (the gate dielectric layer), and the temperature sensor 16 may be on the same conductive layer, such as the conductive layer C1, as the gates GE, but is not limited thereto. In other embodiments, although not shown, the temperature sensor 16 may also be disposed between the dielectric layer IN1 and the dielectric layer IN2, and the temperature sensor 16 may be on the same conductive layer, such as the conductive layer C2, as the sources SE and the drains DE.

In some embodiments, the temperature sensor 16 may be a resistive temperature sensor and may include a circular conductive pattern 160 surrounding the display area R1. For the shape of the top view of the circular conductive pattern 160, reference may be made to the shape of the top view of one of the circular conductive pattern 120 and the circular conductive pattern 121 in FIG. 1. In some embodiments, at least one of the humidity sensor 12 and the temperature sensor 16 may be electrically connected to the driving chip 13 through the circuit board 14, but is not limited thereto. In other embodiments, although not shown, at least one of the humidity sensor 12 and the temperature sensor 16 may be electrically connected to the driving chip 13 without passing through the circuit board 14.

In some embodiments, the resistive temperature (humidity) sensor and the capacitive humidity (temperature) sensor may be disposed on the same metal layer. For instance, the temperature sensor 16 may be the resistive temperature sensor and share the circular conductive pattern 120 or the circular conductive pattern 121 with the capacitive humidity sensor 12. That is, the resistive temperature sensor (the temperature sensor 16) and the capacitive humidity sensor 12 are the metal lines on the same layer. The capacitive humidity sensor 12 includes the circular conductive pattern 120 and the circular conductive pattern 121. The resistive temperature sensor (the temperature sensor 16) includes one of the circular conductive pattern 120 and the circular conductive pattern 121. In this way, there is no need to separately dispose the temperature sensor 16 between the substrate SUB1 and the dielectric layer IN1 (the gate dielectric layer).

In some embodiments, the temperature sensor 16 may be a capacitive temperature sensor and share the circular conductive pattern 120 or the circular conductive pattern 121 with the resistive humidity sensor 12. That is, the capacitive temperature sensor (the temperature sensor 16) and the resistive humidity sensor 12 are the metal lines on the same layer. The capacitive temperature sensor (the temperature sensor 16) includes the circular conductive pattern 120 and the circular conductive pattern 121. The resistive humidity sensor 12 includes one of the circular conductive pattern 120 and the circular conductive pattern 121. In this way, there is no need to separately dispose the temperature sensor 16 between the substrate SUB1 and the dielectric layer IN1 (the gate dielectric layer).

By disposing the temperature sensor 16 on the side of the element array substrate 10 away from the electrophoretic display substrate 11, the temperature sensor 16 is closer to the inorganic dielectric layer and further away from the organic dielectric layer. In this way, the interference to the temperature sensor 16 from the organic dielectric layer, which is easily affected by humidity, can be reduced to improve the accuracy of temperature sensing. Although FIG. 2 takes the resistive temperature sensor as an example, the type of the temperature sensor 16 is not limited thereto. In other embodiments, although not shown, the display device 1 may not include the temperature sensor 16.

In other embodiments, although not shown, the display device 1 may also include a cover plate and a frame glue. The cover plate may cover the electrophoretic display substrate 11. The frame glue may surround the electrophoretic display substrate 11, and the electrophoretic display substrate 11 is sealed between the cover plate and the element array substrate 10 by the frame glue. The following embodiments may all be changed accordingly, which will not be repeated below.

Figure 3:
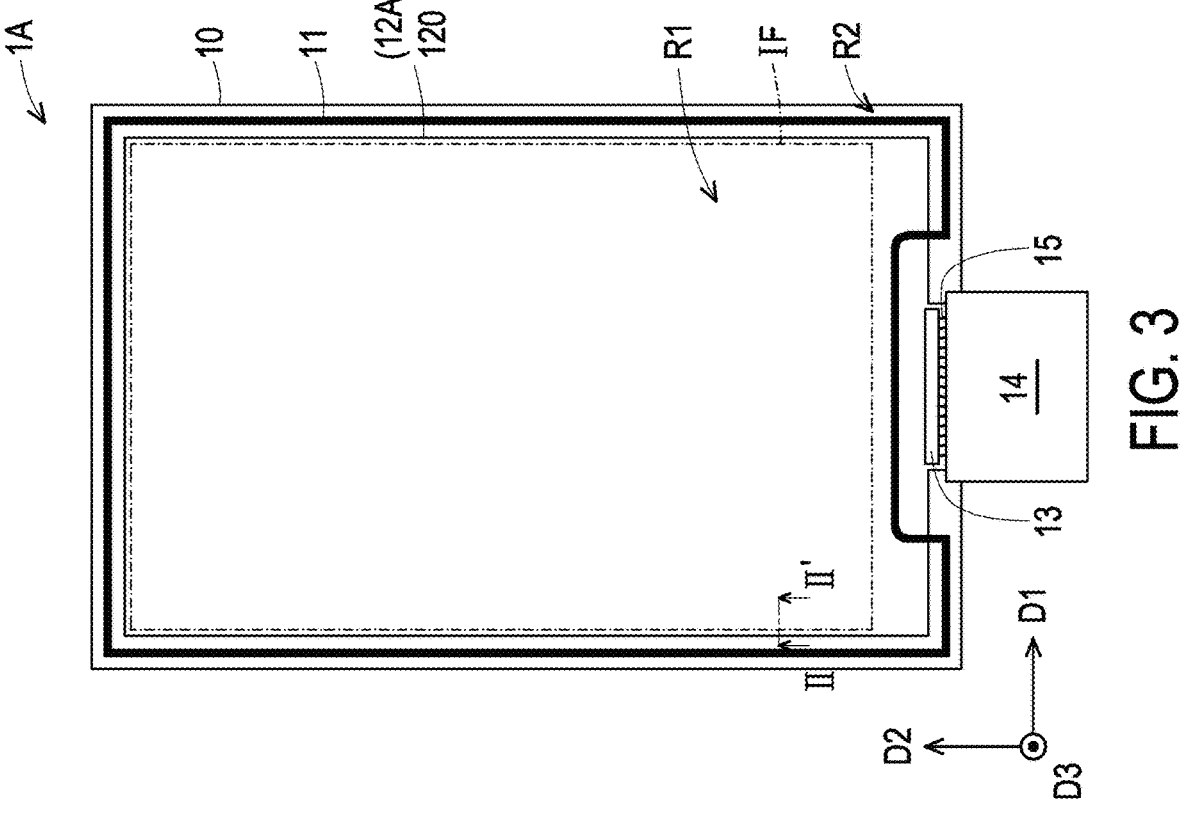
FIG. 3 is a schematic top view of a display device according to the second embodiment of this disclosure.
Figure 4:
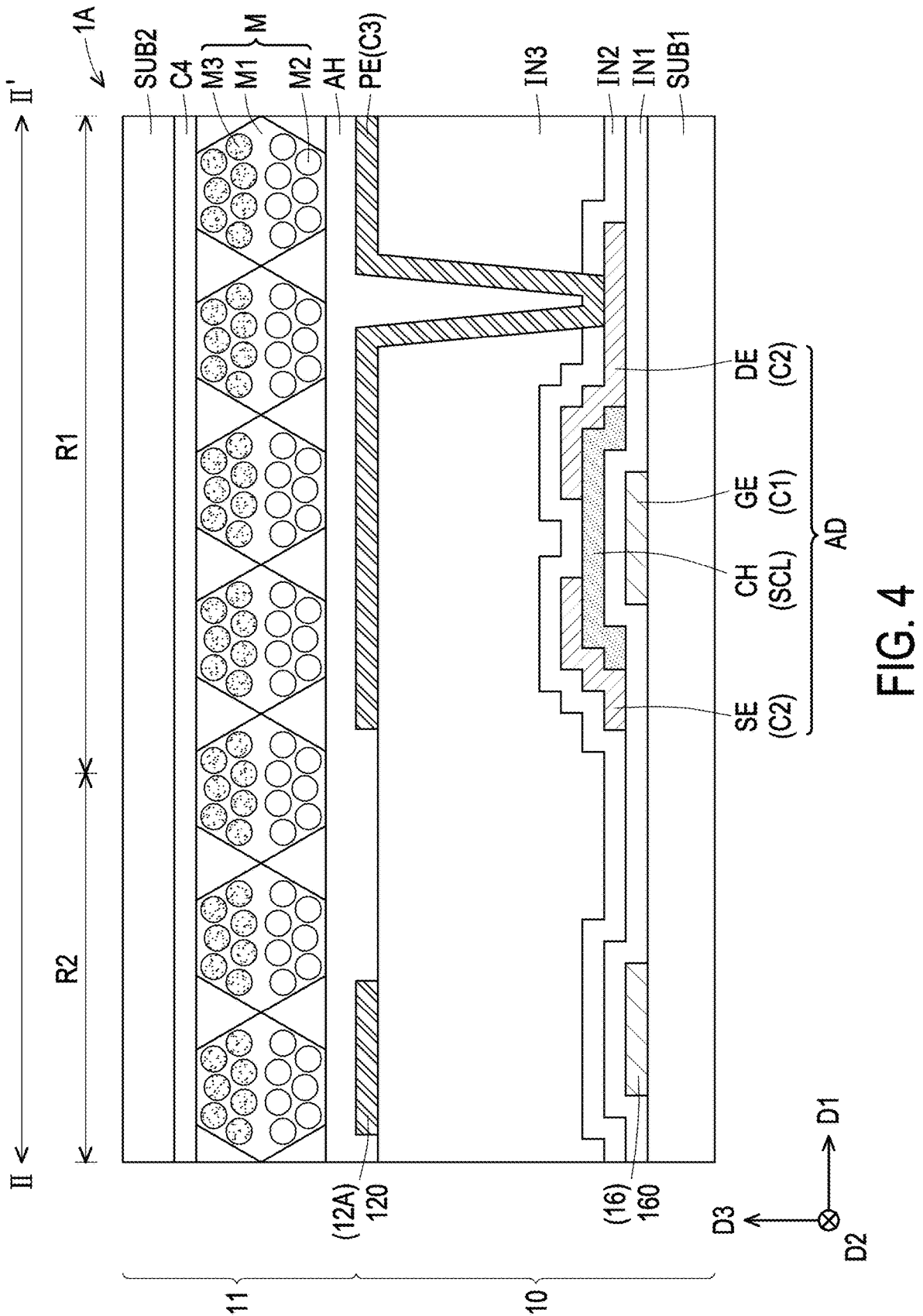
FIG. 4 is a schematic cross-sectional view corresponding to a mid-section line II-II' in FIG. 3.

FIG. 3 is a schematic top view of a display device according to the second embodiment of this disclosure. FIG. 4 is a schematic cross-sectional view corresponding to a mid-section line II-II' in FIG. 3. In order to clearly show the relative configuration relationship between the humidity sensor 12 and other elements, the temperature sensor 16 is omitted in FIG. 3. For the relative configuration relationship between the temperature sensor 16 and other elements or film layers, please refer to FIG. 4.

Please refer to FIG. 3 and FIG. 4. The main difference between a display device 1A and the display device 1 of FIG. 1 and FIG. 2 is that a humidity sensor 12A is a resistive humidity sensor, and the humidity sensor 12A includes the circular conductive pattern 120 but does not include the circular conductive pattern 121 shown in FIG. 1 or FIG. 2. In FIG. 4, the circular conductive pattern 120 of the humidity sensor 12A overlaps the circular conductive pattern 160 of the temperature sensor 16 in the direction D3, but this disclosure is not limited thereto. In other embodiments, the circular conductive pattern 120 and the circular conductive pattern 160 may not overlap or only partially overlap. In other embodiments, although not shown, the display device 1A may not include the temperature sensor 16.

Figure 5:
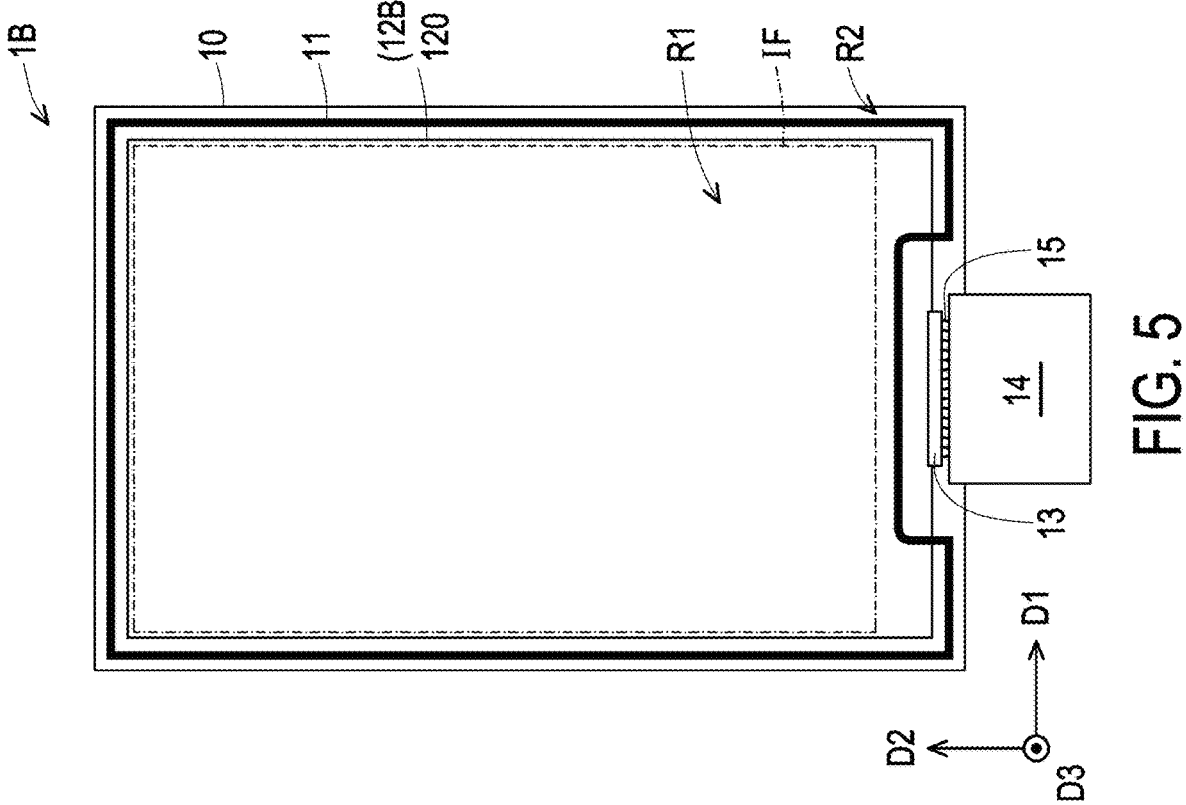
FIG. 5 is a schematic top view of a display device according to the third embodiment of this disclosure.

FIG. 5 is a schematic top view of a display device according to the third embodiment of this disclosure. Please refer to FIG. 5. The main difference between a display device 1B and the display device 1A in FIG. 3 and FIG. 4 is that a humidity sensor 12B is directly electrically connected to the driving chip 13 without passing through the circuit board 14. Although FIG. 5 takes a resistive humidity sensor as an example, the humidity sensor 12B may also be a capacitive humidity sensor (for example, the humidity sensor 12 shown in FIG. 1), and the two circular conductive patterns (the circular conductive pattern 120 and the circular conductive pattern 121 as shown in FIG. 1) of the capacitive humidity sensor may both be directly electrically connected to the driving chip 13 without passing through the circuit board 14.

Although not shown in FIG. 5, the display device 1B may optionally include a temperature sensor (for example, the temperature sensor 16 shown in FIG. 2 or FIG. 4), and the temperature sensor may be electrically connected to the driving chip 13 through the circuit board 14; or the temperature sensor may be directly electrically connected to the driving chip 13 without passing through the circuit board 14.

Figure 6:
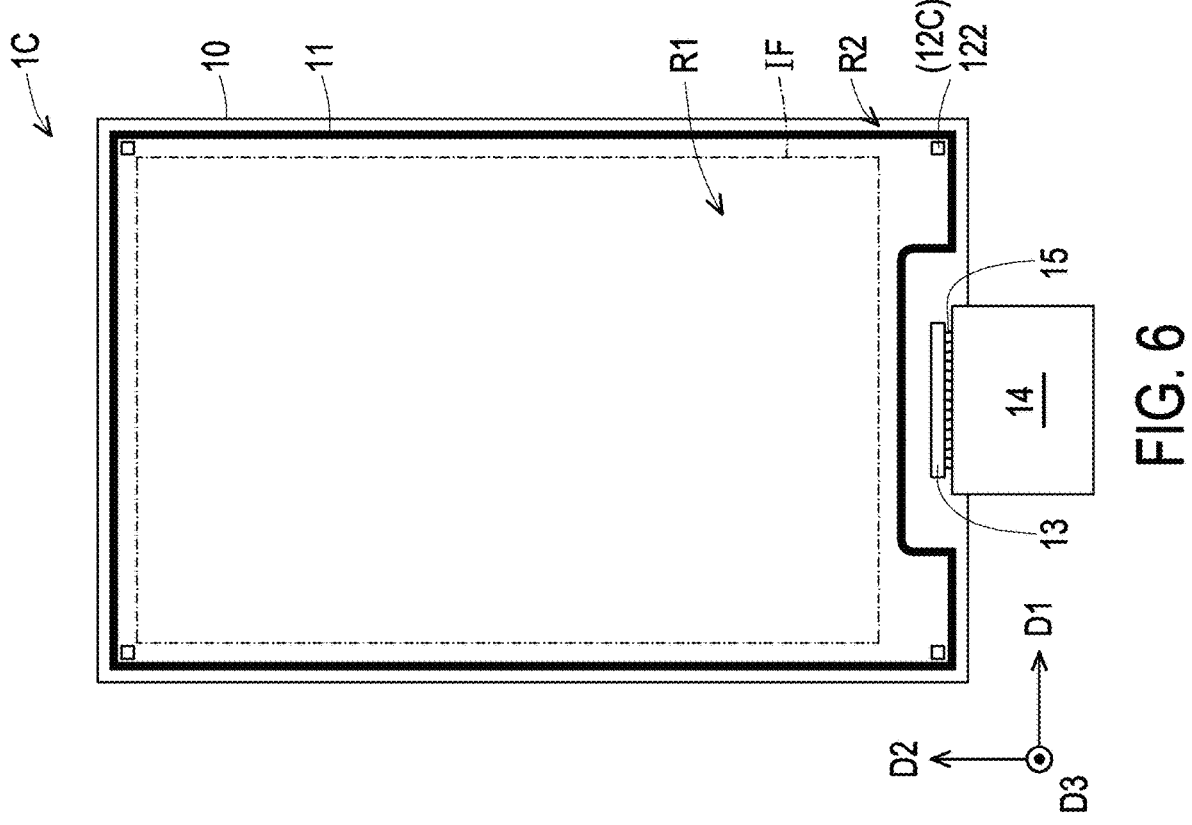
FIG. 6 is a schematic top view of a display device according to the fourth embodiment of this disclosure.
Figure 7:
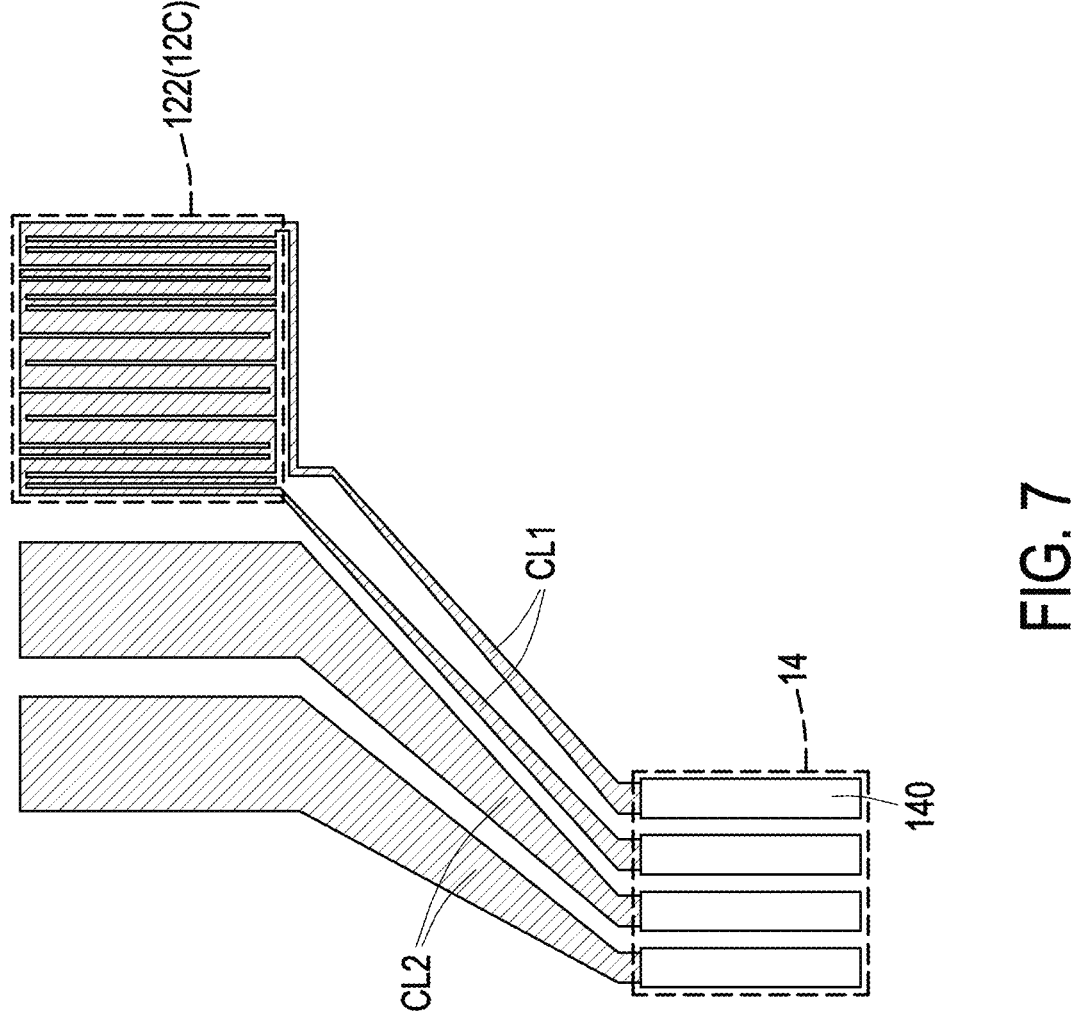
FIG. 7 is a partially enlarged schematic view of a display device in FIG. 6.

FIG. 6 is a schematic top view of a display device according to the fourth embodiment of this disclosure. FIG. 7 is a partially enlarged schematic view of the display device in FIG. 6. Please refer to FIG. 6 and FIG. 7. The main difference between a display device 1C and the display device 1 in FIG. 1 and FIG. 2 is that the display device 1C includes multiple humidity sensors 12C, and the humidity sensors 12C are disposed adjacent to multiple corners of the display device 1C. Taking a quadrilateral display device as an example, the display device 1C includes, for example, four corners and four humidity sensors 12C, and the four humidity sensors 12C are disposed respectively at the four corners of the display device 1C, but is not limited thereto. In other embodiments, although not shown, the number of the humidity sensors 12C may be greater than, equal to, or less than the number of corners of the display device 1C, and at least one of the corners of the display device 1C may be provided with one or more humidity sensors 12C.

The corners of the display device 1C are usually places where water vapor can easily invade. Therefore, disposing multiple humidity sensors 12C adjacent to the corners of the display device 1C helps to improve the accuracy of humidity measurement of the electrophoretic display substrate 11. According to different requirements, at least one of the humidity sensors 12C may overlap the electrophoretic display substrate 11 and be located between the electrophoretic display substrate 11 and the element array substrate 10. In FIG. 6, all the humidity sensors 12C, for example, overlap the electrophoretic display substrate 11 and are located between the electrophoretic display substrate 11 and the element array substrate 10, but the disclosure is not limited thereto.

As shown in FIG. 7, the humidity sensor 12C may include a conductive pattern 122, and the conductive pattern 122 may be electrically connected to multiple pads 140 of the circuit board 14 through multiple wires CL1. The conductive pattern 122 in FIG. 7 is only an example of a capacitive humidity sensor or a resistive humidity sensor, and this disclosure also intends to generalize other types of conductive patterns. In addition, although FIG. 7 shows that the conductive pattern 122 is electrically connected to the circuit board 14 through the wires CL1, and multiple signal lines (not shown, such as the gate lines and the data lines in the display area mentioned above) are electrically connected to the circuit board 14 through multiple wires CL2, this disclosure is not limited thereto. For instance, although not shown, the wires CL1 may be directly connected to the driving chip 13 (such as referring to FIG. 5). In this way, the conductive pattern 122 may be directly connected to the driving chip 13 without passing through the circuit board 14. The embodiments with multiple humidity sensors in this disclosure may all be changed according to this paragraph, which will not be repeated below.

In addition, although not shown in FIG. 6 and FIG. 7, the display device 1C may optionally include the temperature sensor 16 mentioned above or the display device 1C may include multiple temperature sensors. Similar to the humidity sensor 12C of FIG. 6 and FIG. 7, each temperature sensor may include a conductive pattern (not shown; such as the conductive pattern 122 or other types of conductive patterns), wherein the conductive pattern may be electrically connected to the circuit board 14 through multiple wires (not shown), and then electrically connected to the driving chip 13 through the wires 15; or multiple wires may be directly connected to the driving chip 13, so that the conductive pattern of the temperature sensor may be electrically connected to the driving chip 13 without passing through the circuit board 14. Similar to the above, the temperature sensor 16 may be disposed on the side of the element array substrate 10 away from the electrophoretic display substrate 11 (for example, between the substrate SUB1 and the dielectric layer IN1 or between the dielectric layer IN1 and the dielectric layer IN2 in FIG. 2) to improve the accuracy of temperature sensing.

Figure 8:
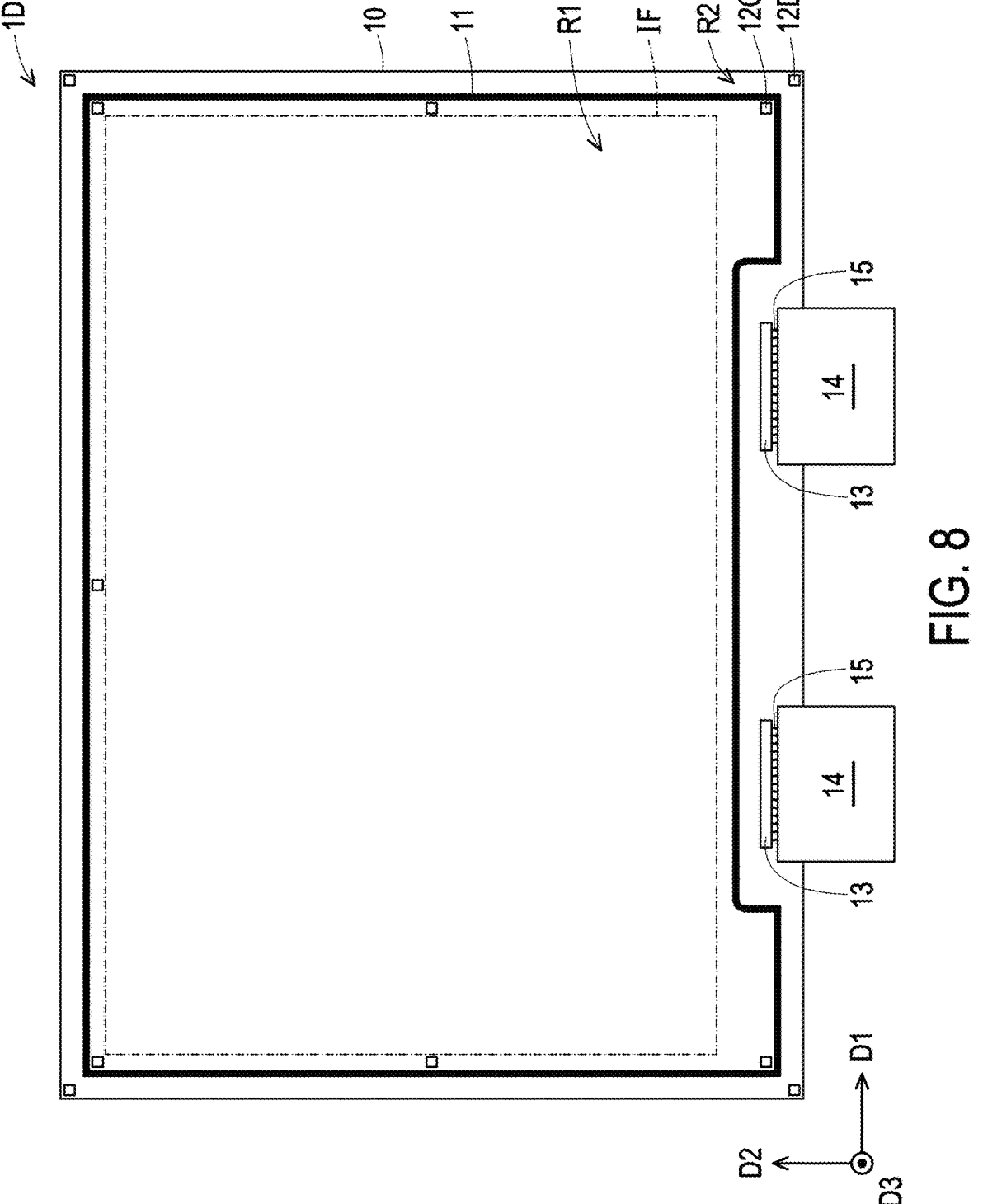
FIG. 8 is a schematic top view of a display device according to the fifth embodiment of this disclosure.

FIG. 8 is a schematic top view of a display device according to the fifth embodiment of this disclosure. Please refer to FIG. 8. The main differences between a display device 1D and the display device 1C in FIG. 6 and FIG. 7 are explained below.

The length of the display device 1D in the direction D1 is greater than the length in the direction D2. In addition, the display device 1D includes multiple driving chips 13 arranged in the direction D1 and multiple circuit boards 14 electrically connected to the driving chips 13, respectively. In the display device 1D, the humidity sensors 12C are not only disposed adjacent to the corners of the display device 1D but are also disposed adjacent to the middle of multiple sides of the display device 1D. Moreover, in addition to the humidity sensors 12C that overlap the electrophoretic display substrate 11, the display device 1D also includes multiple humidity sensors 12D that do not overlap the electrophoretic display substrate 11. The humidity sensors 12D are disposed, for example, on a part of the element array substrate 10 that is not covered by the electrophoretic display substrate 11. The humidity sensors 12C may be used to sense the humidity of the electrophoretic display substrate 11, and the humidity sensors 12D may be used to sense the humidity around the display device 1D. For the conductive pattern of the humidity sensor 12C or the humidity sensor 12D, reference may be made to the conductive pattern 122 in FIG. 7 or other types of conductive patterns, which will not be repeated here.

In addition, although not shown in FIG. 8, the display device 1D may optionally include the temperature sensor 16 mentioned above or the display device 1D may include multiple temperature sensors. Similar to the humidity sensor 12C of FIG. 6 and FIG. 7, each temperature sensor may include a conductive pattern (not shown; such as the conductive pattern 122 or other types of conductive patterns), wherein the conductive pattern may be electrically connected to the circuit board 14 through the multiple wires (not shown), and then electrically connected to the driving chip 13 through the wires 15. Alternatively, multiple wires may be directly connected to the driving chip 13, so that the conductive pattern of the temperature sensor may be electrically connected to the driving chip 13 without passing through the circuit board 14. Similar to the above, the temperature sensor 16 may be disposed on the side of the element array substrate 10 away from the electrophoretic display substrate 11 (for example, between the substrate SUB1 and the dielectric layer IN1 or between the dielectric layer IN1 and the dielectric layer IN2 in FIG. 2) to improve the accuracy of temperature sensing.

Figure 9:
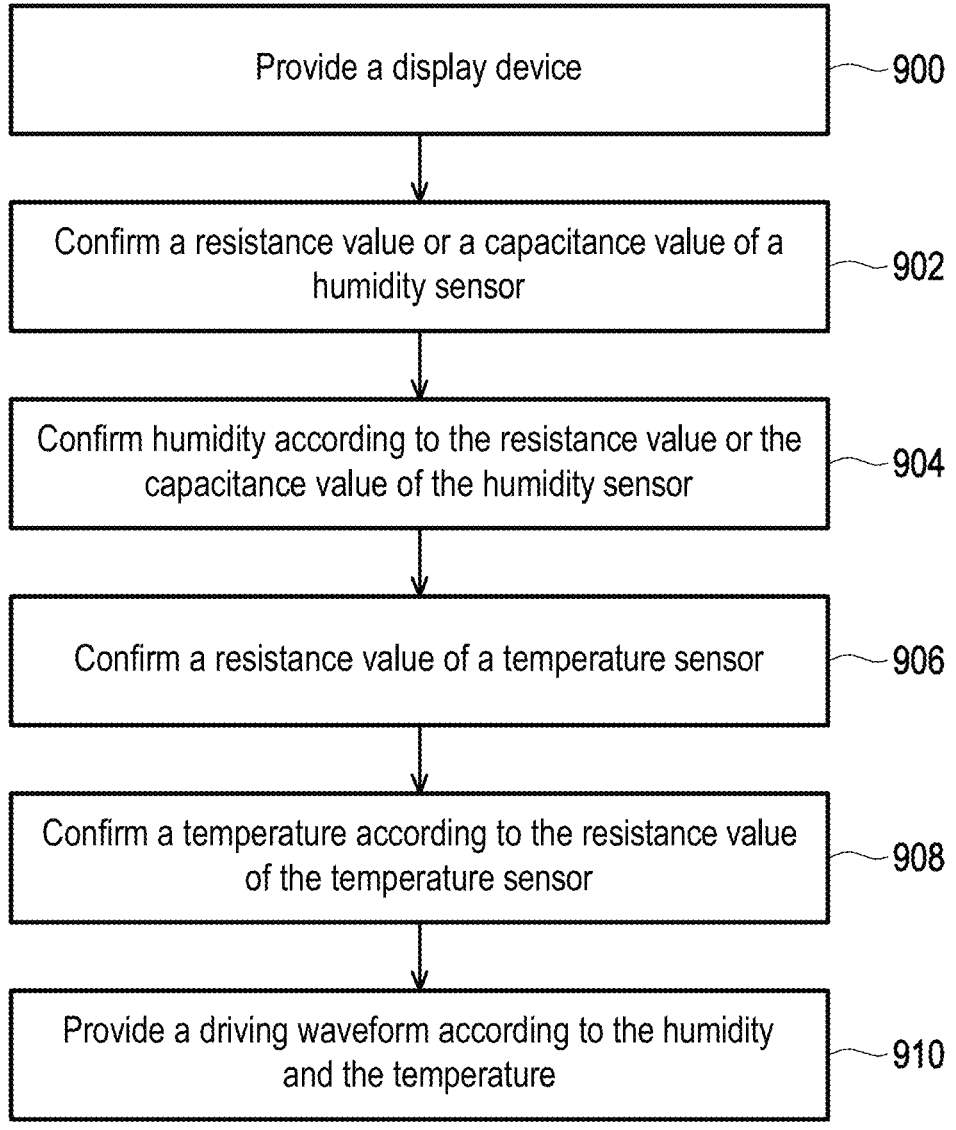
FIG. 9 is a flow chart of a driving method of a display device according to an embodiment of this disclosure.
Figure 10:
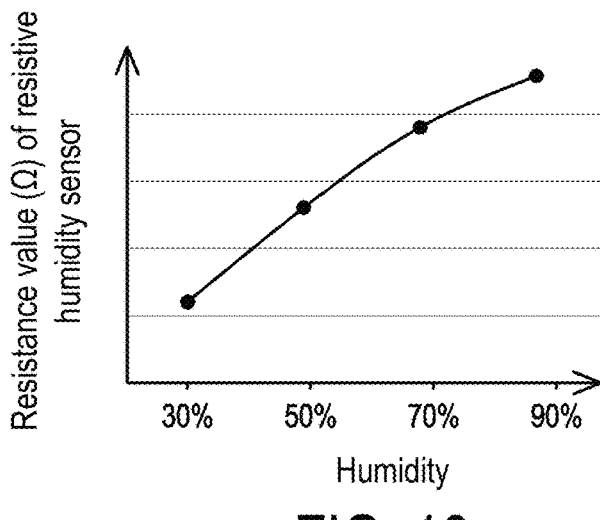
FIG. 10 is a graph showing a relationship between resistance value and humidity of a resistive humidity sensor.
Figure 11:
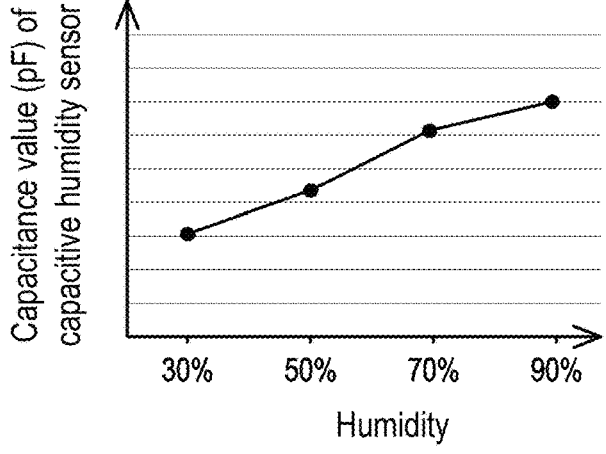
FIG. 11 is a graph showing a relationship between capacitance value and humidity of a capacitive humidity sensor.

FIG. 9 is a flow chart of a driving method of a display device according to an embodiment of this disclosure. FIG. 10 is a graph showing a relationship between resistance value and humidity of a resistive humidity sensor. FIG. 11 is

Figure 12:
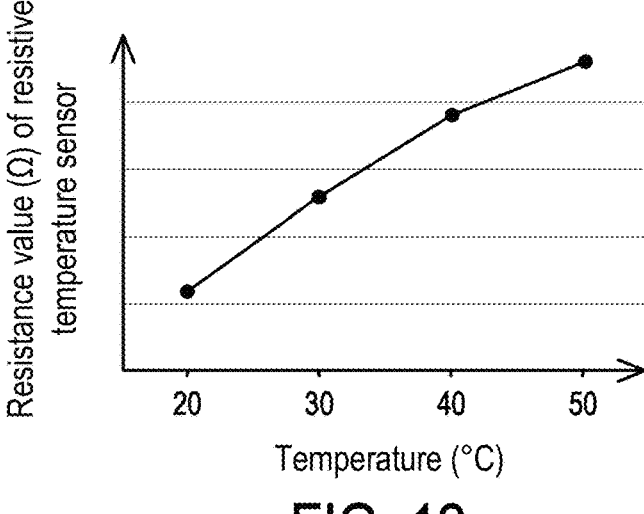
FIG. 12 is a graph showing a relationship between resistance value and temperature of a resistive temperature sensor.

12 a graph showing a relationship between capacitance value and humidity of a capacitive humidity sensor. FIG. 12 is a graph showing a relationship between resistance value and temperature of a resistive temperature sensor.

Please refer to FIG. 9. The driving method of the display device may include providing a display device (refer to step 900). The display device may use the display device of any of the embodiments mentioned above, which will not be repeated here.

The driving method of the display device may also include confirming a resistance value or a capacitance value of a humidity sensor of the display device (refer to step 902). If the humidity sensor is a resistive humidity sensor, then step 902 may be to confirm the resistance value of the humidity sensor of the display device. If the humidity sensor is a capacitive humidity sensor, then step 902 may be to confirm the capacitance value of the humidity sensor of the display device.

The driving method of the display device may also include confirming humidity according to the resistance value or the capacitance value of the humidity sensor (refer to step 904). As shown in FIG. 10 and FIG. 11, the resistance value of the resistive humidity sensor increases as the humidity increases, and the capacitance value of the capacitive humidity sensor increases as the humidity increases. Therefore, after confirming the resistance value of the resistive humidity sensor or the capacitance value of the capacitive humidity sensor, the humidity (such as the humidity of an electrophoretic display substrate, the humidity around the electrophoretic display substrate, the humidity of the electrophoretic display substrate and its surroundings, etc.) may be confirmed through the trend graph showing the relationship between humidity and resistance value as shown in FIG. 10 or the trend graph showing the relationship between humidity and capacitance value as shown in FIG. 11.

The driving method of the display device may also include providing a driving waveform according to the humidity (refer to step 910). By sensing the humidity of the electrophoretic display substrate, the humidity around the electrophoretic display substrate, the humidity of the electrophoretic display substrate and its surroundings, etc., and changing the driving waveform accordingly, the optical performance can be improved.

In an embodiment in which the display device includes a temperature sensor, the driving method of the display device may further include confirming a resistance value of the temperature sensor of the display device (refer to step 906) and confirming a temperature according to the resistance value of the temperature sensor (refer to step 908). As shown in FIG. 12, the resistance value of the resistive temperature sensor increases as the temperature increases. Therefore, after confirming the resistance value of the resistive temperature sensor, the temperature (such as the temperature around the display device) may be confirmed through the trend graph showing the relationship between temperature and resistance value as shown in FIG. 12. Furthermore, in step 910, the driving waveform is also provided according to the temperature in addition to the humidity. Changing the driving waveform by comprehensively considering the environmental parameters such as the humidity and the temperature can help improve the optical performance.

Although the temperature sensing step (including step 906 and step 908) is after the humidity sensing step (including step 902 and step 904) in FIG. 9, this disclosure is not limited thereto. In other embodiments, the temperature sensing step may be proceeded simultaneously with the humidity sensing step or before the humidity sensing step. Alternatively, the driving method of the display device may omit the temperature sensing step, and in step 910, the driving waveform may be provided only according to the humidity and not according to the temperature.

To sum up, in embodiments of this disclosure, the humidity sensor may be used to determine the humidity of the electrophoretic display substrate or its surroundings, and the driving waveform is provided according to the humidity, thereby improving the optical performance of the display device.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A display device, comprising:
an element array substrate comprising a dielectric layer;
an electrophoretic display substrate comprising a bonding layer, disposed on the element array substrate; and
at least one humidity sensor, comprising a conductive pattern disposed on the dielectric layer of the element array substrate, wherein the conductive pattern surrounds a display area of the display device, a first part of the conductive pattern overlaps the electrophoretic display substrate and is located between the bonding layer and the dielectric layer, and a second part of the conductive pattern does not overlap the electrophoretic display substrate.

2. The display device according to claim 1, wherein the at least one humidity sensor is a capacitive humidity sensor or a resistive humidity sensor.

3. The display device according to claim 1, wherein a part of the at least one humidity sensor comprises humidity sensors disposed at least adjacent to a plurality of corners of the display device.

4. The display device according to claim 1, wherein the at least one humidity sensor is disposed between the dielectric layer and the bonding layer.

5. The display device according to claim 1, further comprising:
a driving chip, disposed in a surrounding area of the display device and electrically connected to the at least one humidity sensor, the element array substrate, and the electrophoretic display substrate.

6. The display device according to claim 5, further comprising:
a circuit board, wherein the at least one humidity sensor is electrically connected to the driving chip through the circuit board.

7. The display device according to claim 1, further comprising:
a temperature sensor, disposed in the element array substrate and located on a side away from the electrophoretic display substrate.

8. The display device according to claim 7, wherein the element array substrate comprises a substrate and a gate dielectric layer disposed on the substrate, and the temperature sensor is disposed between the substrate and the gate dielectric layer.

9. The display device according to claim 7, further comprising:
a driving chip, disposed in a surrounding area of the display device and electrically connected to the at least one humidity sensor, the temperature sensor, the element array substrate, and the electrophoretic display substrate.

10. A driving method of a display device, comprising:
providing the display device, wherein the display device comprises an element array substrate comprising a dielectric layer, an electrophoretic display substrate comprising a bonding layer disposed on the element array substrate and at least one humidity sensor comprising a conductive pattern disposed on the dielectric layer of the element array substrate, wherein the conductive pattern surrounds a display area of the display device, a first part of the conductive pattern overlaps the electrophoretic display substrate and is located between the bonding layer and the dielectric layer, and a second part of the conductive pattern does not overlap the electrophoretic display substrate;
confirming a resistance value or a capacitance value of the at least one humidity sensor of the display device;
confirming humidity according to the resistance value or the capacitance value of the at least one humidity sensor; and
providing a driving waveform according to the humidity.

11. The driving method of the display device according to claim 10, further comprising:
confirming a resistance value of a temperature sensor of the display device; and
confirming a temperature according to the resistance value of the temperature sensor,
wherein the driving waveform is also provided according to the temperature in addition to the humidity.

\* \* \* \* \*